(12) United States Patent
Schwartz et al.

(10) Patent No.: US 8,096,472 B2
(45) Date of Patent: Jan. 17, 2012

(54) IMAGE SENSOR ASSEMBLY FOR OPTICAL READER

(75) Inventors: Eric D. Schwartz, Pittsford, NY (US); Gerard Beckhusen, Baldwinsville, NY (US); Robert J. Hennick, Cayuga, NY (US); Robert C. Hinkley, Milton, VT (US); Edward B. Hubben, Skaneateles, NY (US); Vivian L. Hunter, Baldwinsville, NY (US); Brian L. Jovanovski, Syracuse, NY (US); Michael P. Lacey, Camillus, NY (US); Melvin D. McCall, Homer, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1086 days.

(21) Appl. No.: 11/895,277

(22) Filed: Aug. 23, 2007

(65) Prior Publication Data

US 2008/0128511 A1 Jun. 5, 2008

Related U.S. Application Data

(60) Division of application No. 10/861,329, filed on Jun. 4, 2004, now Pat. No. 7,306,155, which is a continuation of application No. 10/375,711, filed on Feb. 27, 2003, now abandoned, which is a continuation of application No. 09/883,873, filed on Jun. 18, 2001, now Pat. No. 6,550,679, which is a continuation of application No. 09/112,028, filed on Jul. 8, 1998, now Pat. No. 6,275,388, said application No. 10/861,329 is a continuation-in-part of application No. 10/458,353, filed on Jun. 10, 2003, now abandoned, which is a continuation of application No. 09/658,811, filed on Sep. 11, 2000, now Pat. No. 6,607,128, which is a continuation of application No. 09/111,476, filed on Jul. 8, 1998, now Pat. No. 6,119,939, said application No. 10/861,329 is a continuation-in-part of application No. 10/609,095, filed on Jun. 27, 2003, now abandoned, which is a continuation of application No. 10/079,366, filed on Feb. 20, 2000, now Pat. No. 6,659,350, which is a continuation of application No. 09/704,017, filed on Nov. 1, 2000, now Pat. No. 6,371,374, which is a continuation of application No. 09/111,583, filed on Jul. 8, 1998, now Pat. No. 6,164,554.

(51) Int. Cl.
*G06K 7/10* (2006.01)

(52) U.S. Cl. ........................................ 235/454

(58) Field of Classification Search .............. 235/462.01–462.49, 454
See application file for complete search history.

(56) References Cited

U.S. PATENT DOCUMENTS 3,718,761 A 2/1973 Myer
(Continued)

FOREIGN PATENT DOCUMENTS

DE 2445727 A1 4/1976
(Continued)

OTHER PUBLICATIONS

Report by Applicants, Jul. 2006, "Photographs of Optical Reader," (Report contains series of photographs of SCANQUEST optical reader believed to be in public use more than one year prior to earliest cliamed priority date).

*Primary Examiner* — Jamara Franklin

(74) *Attorney, Agent, or Firm* — Heslin Rothenberg Farley & Mesiti P.C.

(57) ABSTRACT

There is described an optical assembly. In one aspect, the optical assembly can be used in an optical reader. In another aspect, the optical assembly can include a support for supporting various components.

28 Claims, 10 Drawing Sheets

U.S. PATENT DOCUMENTS

| | | |
|---|---|---|
| 3,825,747 A | 7/1974 | Thomson |
| 4,315,245 A | 2/1982 | Nakahara et al. |
| 4,408,120 A | 10/1983 | Hara et al. |
| 4,488,679 A | 12/1984 | Bockholt et al. |
| 4,516,017 A | 5/1985 | Hara et al. |
| 4,538,072 A | 8/1985 | Immler et al. |
| 4,570,057 A | 2/1986 | Chadima, Jr. et al. |
| 4,591,706 A | 5/1986 | Sims |
| 4,743,773 A | 5/1988 | Katana et al. |
| 4,804,949 A | 2/1989 | Faulkerson |
| 4,816,659 A | 3/1989 | Bianco et al. |
| 4,832,003 A | 5/1989 | Yabe |
| 4,859,842 A | 8/1989 | Suda et al. |
| 4,866,258 A | 9/1989 | Ueda et al. |
| 4,900,907 A | 2/1990 | Matusima et al. |
| 4,953,539 A | 9/1990 | Nakamura et al. |
| 5,208,701 A | 5/1993 | Maeda |
| 5,210,406 A | 5/1993 | Beran et al. |
| 5,254,844 A | 10/1993 | Krichever et al. |
| 5,280,161 A | 1/1994 | Niwa |
| 5,283,699 A | 2/1994 | Komai et al. |
| 5,291,009 A | 3/1994 | Roustaei |
| 5,291,028 A | 3/1994 | Droge et al. |
| 5,296,689 A | 3/1994 | Reddersen et al. |
| 5,331,176 A | 7/1994 | Sant' Anselmo et al. |
| 5,347,121 A | 9/1994 | Rudeen |
| 5,349,172 A | 9/1994 | Roustaei |
| 5,354,977 A | 10/1994 | Roustaei |
| 5,359,185 A | 10/1994 | Hanson |
| 5,378,883 A | 1/1995 | Batterman et al. |
| 5,463,213 A | 10/1995 | Honda |
| 5,468,950 A | 11/1995 | Hanson |
| 5,473,149 A | 12/1995 | Miwa et al. |
| 5,477,044 A | 12/1995 | Aragon |
| 5,484,994 A | 1/1996 | Roustaei |
| 5,486,688 A | 1/1996 | Iima et al. |
| 5,504,317 A | 4/1996 | Takahashi |
| 5,504,367 A | 4/1996 | Arackellian et al. |
| 5,521,366 A | 5/1996 | Wang et al. |
| 5,532,467 A | 7/1996 | Roustaei |
| 5,550,675 A | 8/1996 | Komatsu |
| 5,574,272 A | 11/1996 | Seo et al. |
| 5,591,955 A | 1/1997 | Laser |
| 5,598,007 A | 1/1997 | Bunce et al. |
| 5,600,116 A | 2/1997 | Seo et al. |
| 5,600,121 A | 2/1997 | Kahn et al. |
| 5,602,379 A | 2/1997 | Uchimura et al. |
| 5,621,203 A | 4/1997 | Swartz et al. |
| 5,640,001 A | 6/1997 | Danielson et al. |
| 5,656,805 A | 8/1997 | Plesko |
| 5,684,290 A | 11/1997 | Arackellian et al. |
| 5,689,104 A | 11/1997 | Suzuki et al. |
| 5,697,699 A | 12/1997 | Seo et al. |
| 5,703,348 A | 12/1997 | Suzuki et al. |
| 5,737,122 A | 4/1998 | Wilt et al. |
| 5,744,791 A | 4/1998 | Isaac et al. |
| 5,747,787 A | 5/1998 | Shin et al. |
| 5,750,977 A | 5/1998 | Suzuki |
| 5,756,981 A | 5/1998 | Roustaei et al. |
| 5,777,314 A | 7/1998 | Roustaei |
| 5,780,834 A | 7/1998 | Havens et al. |
| 5,783,811 A | 7/1998 | Feng et al. |
| 5,786,582 A | 7/1998 | Roustaei et al. |
| 5,811,784 A | 9/1998 | Tausch et al. |
| 5,814,803 A | 9/1998 | Olmstead et al. |
| 5,815,200 A | 9/1998 | Ju et al. |
| 5,886,338 A | 3/1999 | Arackellian et al. |
| 5,894,348 A | 4/1999 | Bacchi et al. |
| 5,902,988 A | 5/1999 | Durbin |
| 5,923,032 A | 7/1999 | Carlson et al. |
| RE36,528 E | 1/2000 | Roustaei |
| 6,035,147 A | 3/2000 | Kurosawa |
| 6,092,728 A | 7/2000 | Li et al. |
| 6,119,939 A | 9/2000 | Schwartz et al. |
| 6,164,544 A | 12/2000 | Schwartz et al. |
| 6,550,679 B2 | 4/2003 | Hennick et al. |
| 6,607,128 B1 | 8/2003 | Schwartz et al. |
| 6,631,846 B2 | 10/2003 | Piva et al. |
| 6,648,227 B2 | 11/2003 | Swartz et al. |
| 6,659,350 B2 | 12/2003 | Schwartz et al. |
| 2003/0127516 A1 | 7/2003 | Hennick et al. |
| 2003/0209603 A1 | 11/2003 | Schwartz et al. |
| 2004/0000592 A1 | 1/2004 | Schwartz et al. |

FOREIGN PATENT DOCUMENTS

| | | |
|---|---|---|
| EP | 431831 A1 | 6/1991 |
| EP | 548951 A2 | 6/1993 |
| EP | 905537 A1 | 3/1999 |
| EP | 944017 A2 | 9/1999 |
| JP | 63067692 A | 3/1988 |
| JP | 11314406 A | 11/1999 |
| WO | WO-9613799 A2 | 5/1996 |
| WO | WO-9719416 A1 | 5/1997 |
| WO | WO-9941545 A1 | 8/1999 |

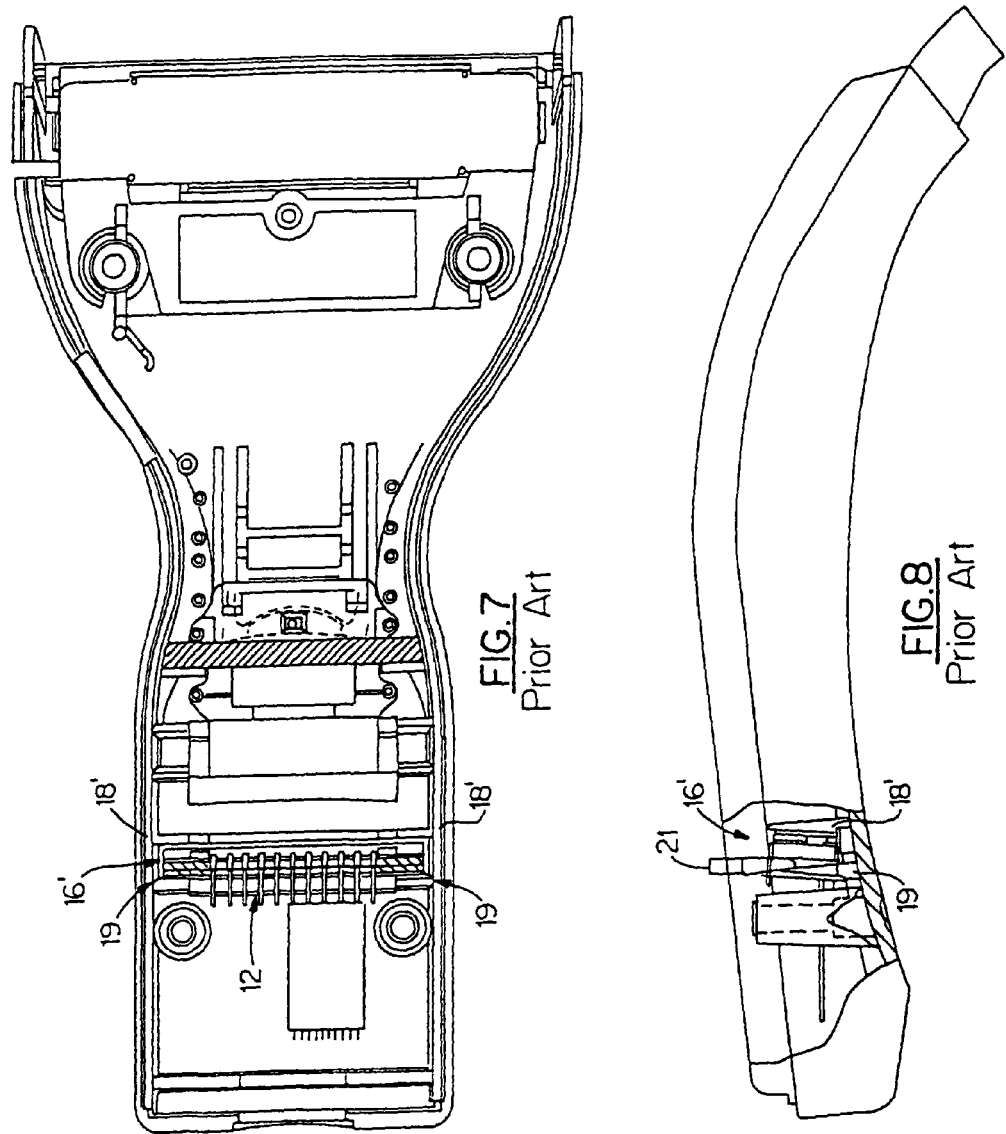

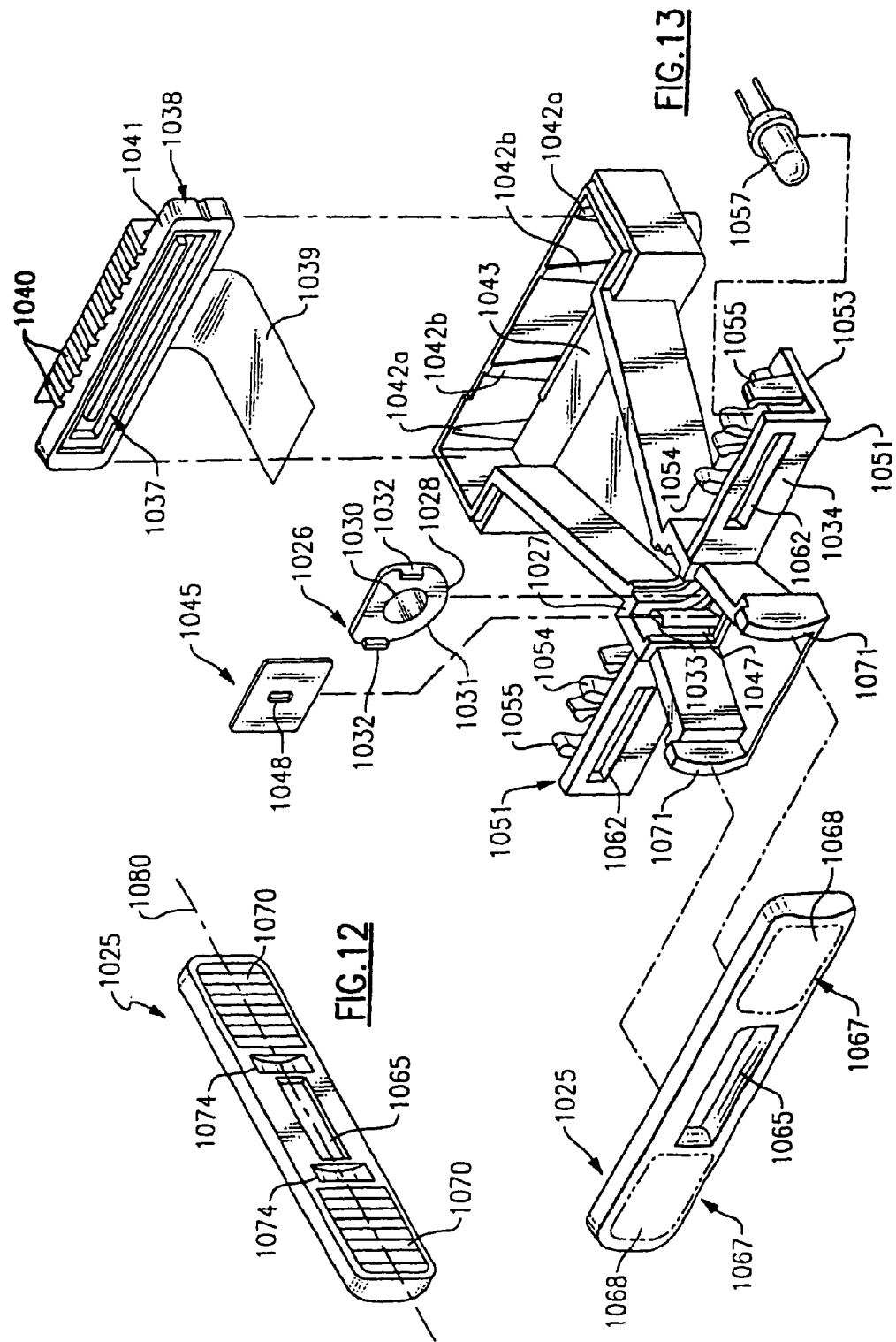

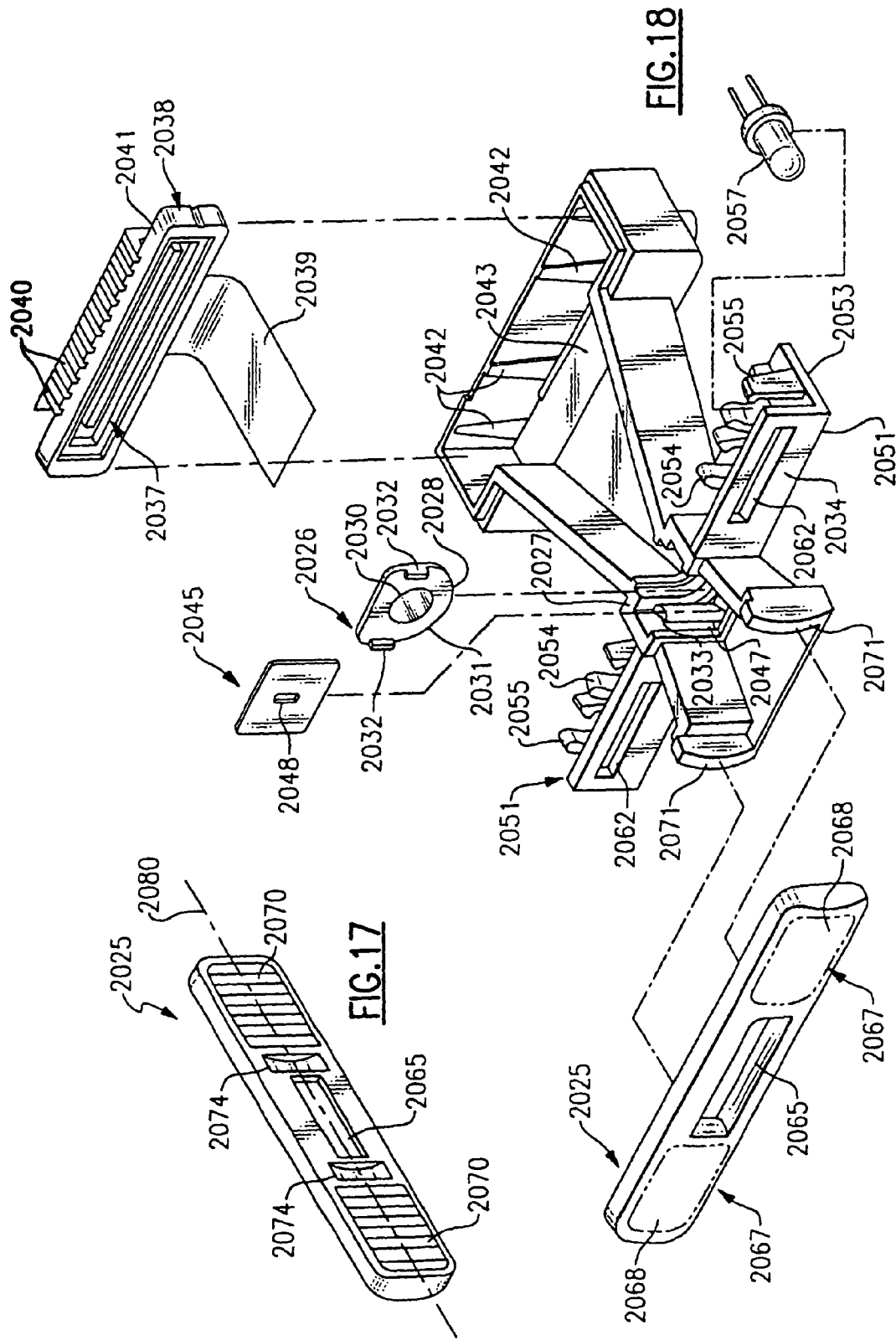

IMAGE SENSOR ASSEMBLY FOR OPTICAL READER

CROSS REFERENCE TO RELATED APPLICATION

This application is a divisional of U.S. patent application Ser. No. 10/861,329, filed Jun. 4, 2004, now U.S. Patent Publication No. 2005-0011954, which is a continuation of U.S. patent application Ser. No. 10/375,711, filed Feb. 27, 2003, now U.S. Patent Publication No. 2003-0127516, which is a continuation of U.S. patent application Ser. No. 09/883,873, filed Jun. 18, 2001, now U.S. Pat. No. 6,550,679, which is a continuation of U.S. patent application Ser. No. 09/112,028, filed Jul. 8, 1998, now U.S. Pat. No. 6,275,388. The above noted application Ser. No. 10/861,329 is also a continuation-in-part of U.S. patent application Ser. No. 10/458,353, filed Jun. 10, 2003, (now abandoned), which is a continuation of U.S. patent application Ser. No. 09/658,811, filed Sep. 11, 2000, now U.S. Pat. No. 6,607,128, which is a continuation of U.S. patent application Ser. No. 09/111,476, filed Jul. 8, 1998, now U.S. Pat. No. 6,119,939. The above noted application Ser. No. 10/861,329 is also a continuation-in-part of U.S. patent application Ser. No. 10/609,095, filed Jun. 27, 2003 (now abandoned), which is a continuation of U.S. patent application Ser. No. 10/079,366, filed Feb. 20, 2002, now U.S. Pat. No. 6,659,350, which is a continuation of U.S. patent application Ser. No. 09/704,017, filed Nov. 1, 2000, now U.S. Pat. No. 6,371,374, which is a continuation of U.S. patent application Ser. No. 09/111,583, filed Jul. 8, 1998, now U.S. Pat. No. 6,164,544. The priorities of all of the above applications are claimed and the disclosure of each of the above application is incorporated herein by reference in its entirety.

BACKGROUND OF THE INVENTION

1. Field of the Invention

The present invention relates generally to assemblies in general and particularly to an optical assembly.

2. Background of the Prior Art

A typical image sensor chip 12 of the type mounted in various types of devices, such as medical instruments, video cameras, and bar code readers is shown in FIG. 6. The image sensor shown includes a bottom planar member 110 carrying a pixel array 112. Front and rear lead frames 114 initially extend peripherally from the pixel array and are formed to extend downwardly about front and rear edges respectively, of bottom planar member 110 terminating in pins 32. Image sensor 12 further includes top planar member 118 which rests against pixel array 112 and lead frame 114. Top planar member 118 is secured against lead frames 114 and against pixel plane 112 by the force of adhesive material interposed between top and bottom planar members 110 and 118. Adhesive material is disposed mainly about the periphery of pixel array 112. In addition, image sensor 12 may include a glass layer 120. In some popular models of image sensors, top planar member 118 is configured in the form of a frame which retains glass layer 120. Thus, it is seen that image sensor 12 is of a stacked-up configuration. Like most structures whose design is of a generally stacked-up configuration, the thickness, t, of assembly 12 cannot be tightly controlled. In the manufacturing of sensor 12, the thickness of the various layers will vary from structure to structure. Accordingly, the total thickness, t, will vary from structure to structure. The spacing, s, between top and bottom planar members 110 and 118 of image sensor 12 is particularly difficult to control given that such spacing is a function of the amount of adhesive used, the thickness of pixel array 112 and the thickness and the thickness of lead frames 114.

Particularly in applications where such an image sensor must be side mounted (not "plugged into" a PCB), as is the case with most bar code reader applications, then the inability to tightly control image sensor thickness, t, can negatively impact operational characteristics of the device in which the sensor is incorporated in. An explanation of how the inability to tightly control sensor thickness can impact operation of a bar code reader is made with reference to FIGS. 7 and 8 showing a multilayered image sensor incorporated in a bar code reader according to a prior art mounting scheme. In the mounting scheme shown, a multilayered image sensor 12 is disposed into a holding pocket 16 defined by substantially equally tensioned pairs of rear pins 19 and forward pins 18. The prior art mounting system may further include a spacer 21 for biasing sensor 12 forwardly against forward pins 18.

A number of operational problems can arise with this mounting scheme. If the thickness of the image sensor which is manufacturable to a thickness in the tolerance range from $T_{min}$ to $T_{max}$ tends toward $T_{min}$ then pins 18, 19 may not supply sufficient pressure to image sensor 12 to hold sensor 12 in a secure position. Further, it can be seen that the distance, d, from any fixed point in space, $P_s$, to any fixed point $P_p$, on the plane of pixel array 112 will vary depending on the total thickness, t, of sensor 12 which is a thickness having a high degree of variability. This is not preferred since controlling the distance, d, is important to controlling the operation of the reader.

There is a need for an image sensor mounting system for mounting an image sensor in an imaging device which minimizes operational problems resulting from the inability to tightly control an image sensor chip's thickness.

[The following is text excerpted from U.S. patent application Ser. No. 09/111,426, U.S. Pat. No. 6,119,939.]

Although the advantages associated with light emitting diodes (LEDs) when used in barcode scanning equipment are well known, the level of the intensity produced by this type of lamp is relatively low when compared to other light sources such as halogen lamps or arc lamps. In an effort to improve the effectiveness of light emitting diodes in this application, it is sometimes customary to employ a relatively large number of lamps aligned in one or more rows above or below the imaging lens. As a result, the target region, as well as the periphery of the target region, are flooded with an excessive amount of light. This approach, however, is space consuming and poses certain assembly and alignment problems.

Optical units have also been devised for providing coplanar illumination wherein the light emitting diodes are mounted in the same plane as the imaging onto both sides of the imaging lens. The light from the light emitting diodes is further passed through magnifying lens to project the light onto the target region. Additionally, diffusers are used in association with the LEDs to more uniformly distribute the light within the target area. Here again, these optical units overcome many of the problems associated with LED illumination systems. They nevertheless pose certain other problems relating to bringing the components together in assembly to provide a compact, easy to install and adjust unit suitable for use in a hand-held long range scanner as opposed to a scanner that reads barcodes in contact.

[End of text excerpted from U.S. patent application Ser. No. 09/111,426, U.S. Pat. No. 6,119,939.]

[The following is text excerpted from U.S. patent application Ser. No. 09/111,583 U.S. Pat. No. 6,164,544.]

Although the advantages associated with light emitting diodes (LEDs) when used in barcode scanning equipment are well known, the level of the intensity produced by this type of lamp is relatively low when compared to other light sources, such as halogen lamps or arc lamps. In an effort to improve the effectiveness of light emitting diodes in this application, it is sometimes customary to employ a relatively large number of lamps aligned in one or more rows above or below the imaging lens. As a result, the target region, as well as the periphery of the target region, are flooded with excessive light energy. This approach, however, is space consuming and poses certain assembly and alignment problems.

Optical units have also been devised for providing coplanar illumination wherein the light emitting diodes are mounted in the same plane as the imager on both sides of the imaging lens. Light from the light-emitting diodes is further passed through magnifying lens to project the light onto the barcode target. Additionally, diffusers are used in association with the LEDs to more uniformly distribute the light within the target area. Here again, these optical units overcome many of the problems associated with LED illumination systems. They nevertheless pose certain other problems relating to bringing the components together in assembly to provide compact, easy to install and adjust units suitable for use in a hand-held long range scanner.

[End of text excerpted from U.S. patent application Ser. No. 09/111,583 U.S. Pat. No. 6,164,544.]

BRIEF DESCRIPTION OF THE DRAWINGS

The preferred embodiment of the invention will now be described, by way of example only, with reference to the accompanying Figures wherein like members bear like reference numeral and wherein:

FIG. 7 is a top view of a prior art optical reader illustrating a prior art image sensor mounting system;

FIG. 8 is a cross sectional side view of the reader shown in FIG. 7.

[The following is text excerpted from U.S. patent application Ser. No. 09/111,426, U.S. Pat. No. 6,119,939.]

Figure 9:
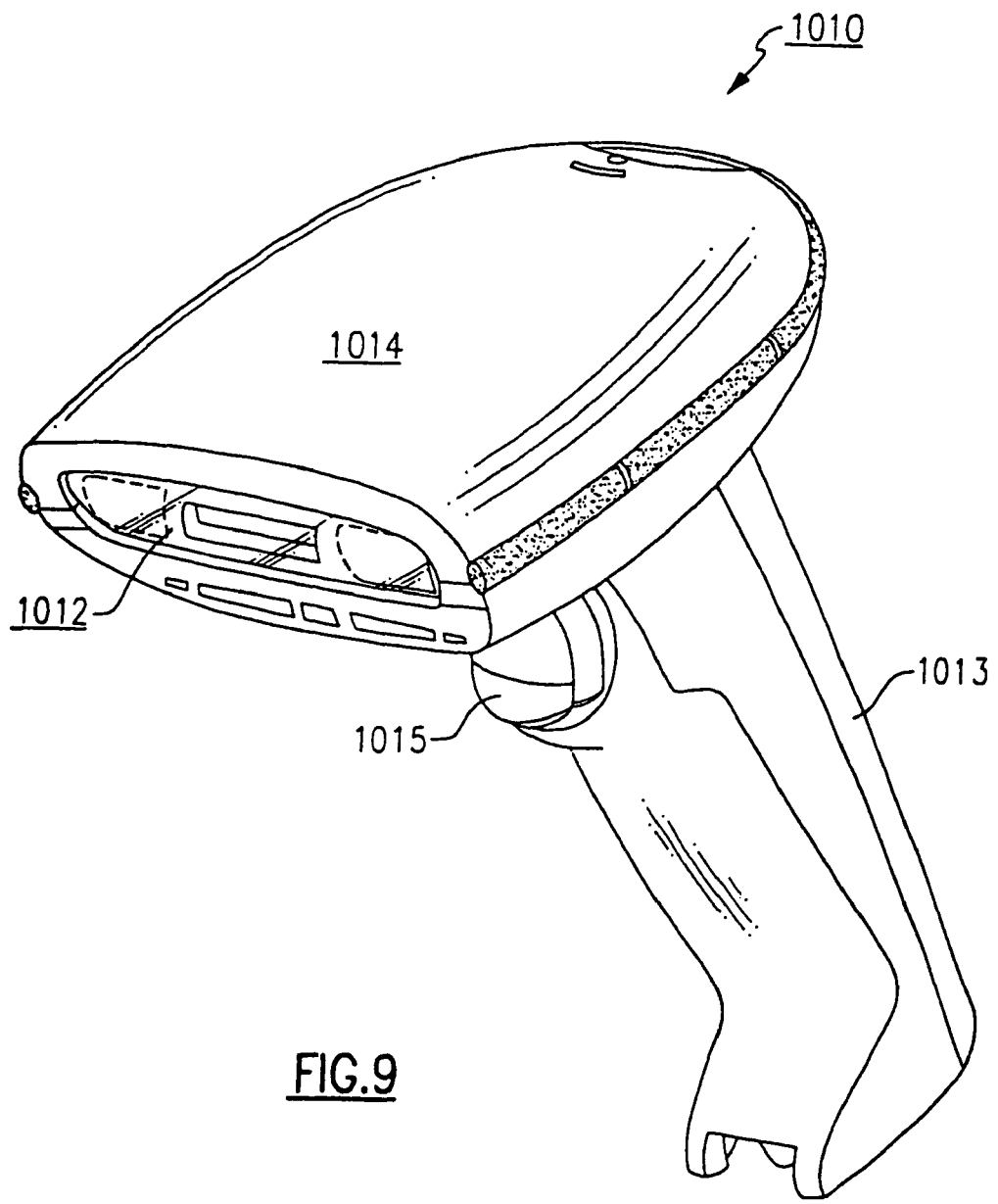
Figure 10:
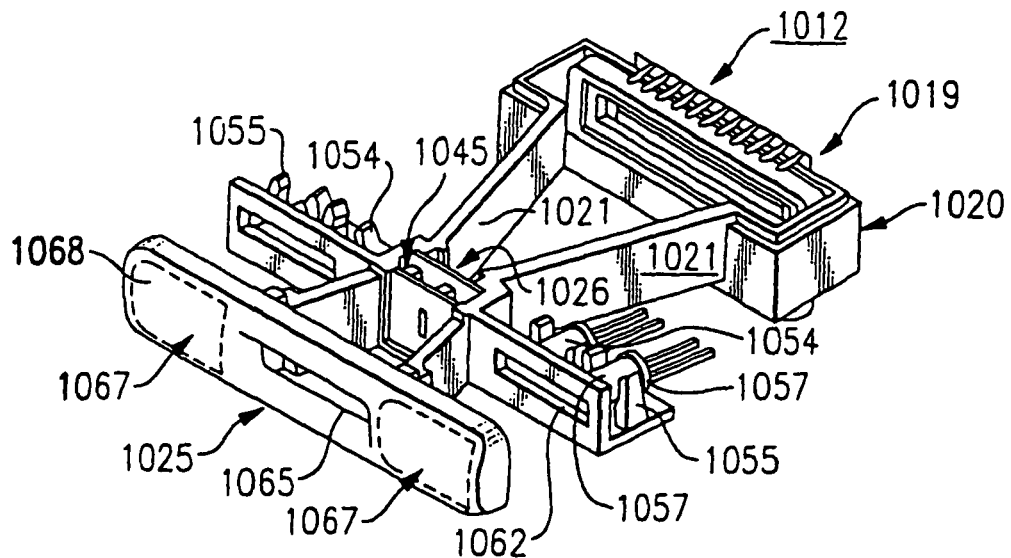
Figure 11:
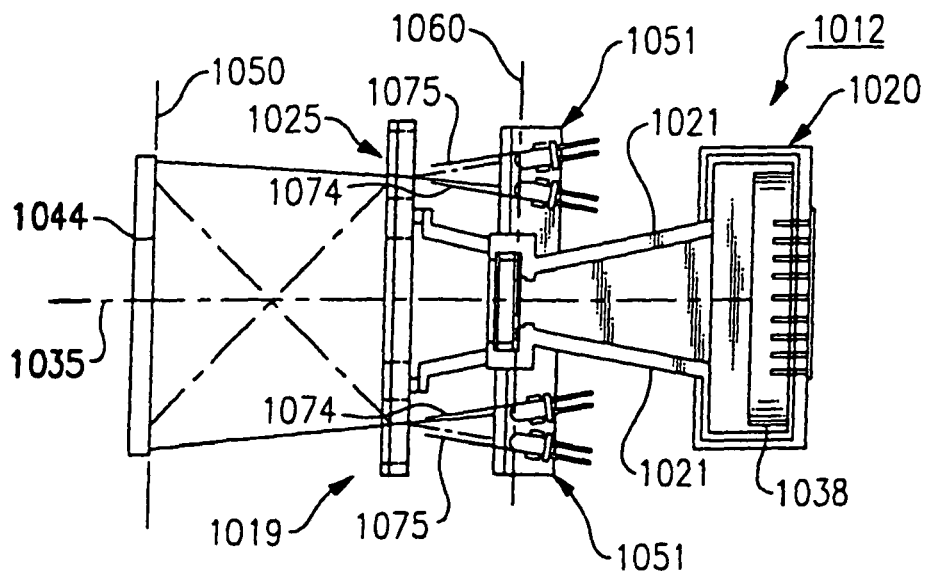

FIG. 9 is a perspective view of a hand-held barcode reader housing the optical assembly of the present invention;

FIG. 10 is an enlarged perspective view showing the optical assembly encompassing the teachings of the present invention;

FIG. 11 is a top plan view of the optical assembly illustrated in FIG. 10;

FIG. 12 is a slightly enlarged exploded view in perspective of the present optical assembly; and FIG. 13 is a perspective view showing the back of the half cylinder element.

[End of text excerpted from U.S. patent application Ser. No. 09/111,426, U.S. Pat. No. 6,119,939.]

[The following is text excerpted from U.S. patent application Ser. No. 09/111,583 U.S. Pat. No. 6,164,544.]

Figure 14:
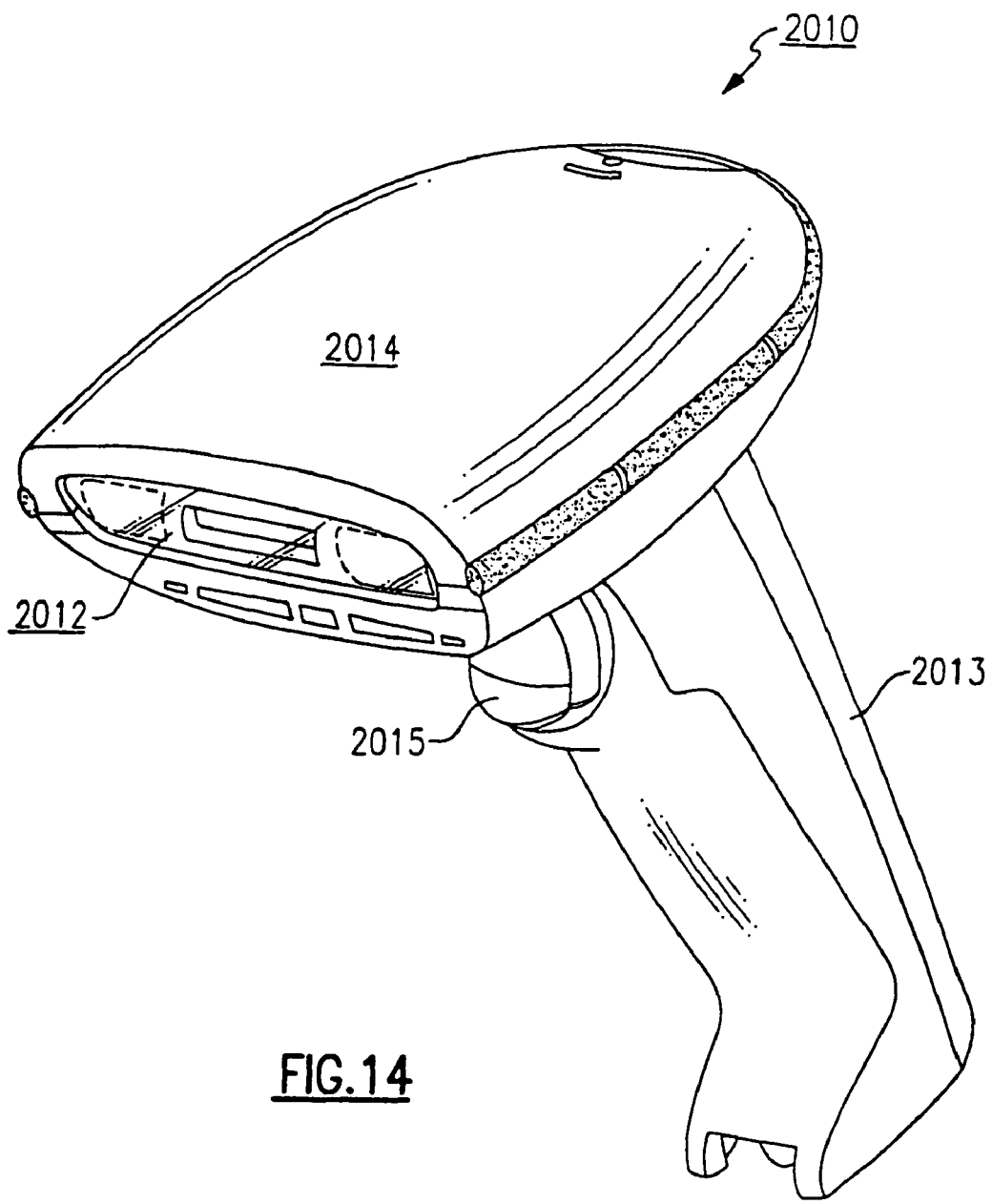
Figure 15:
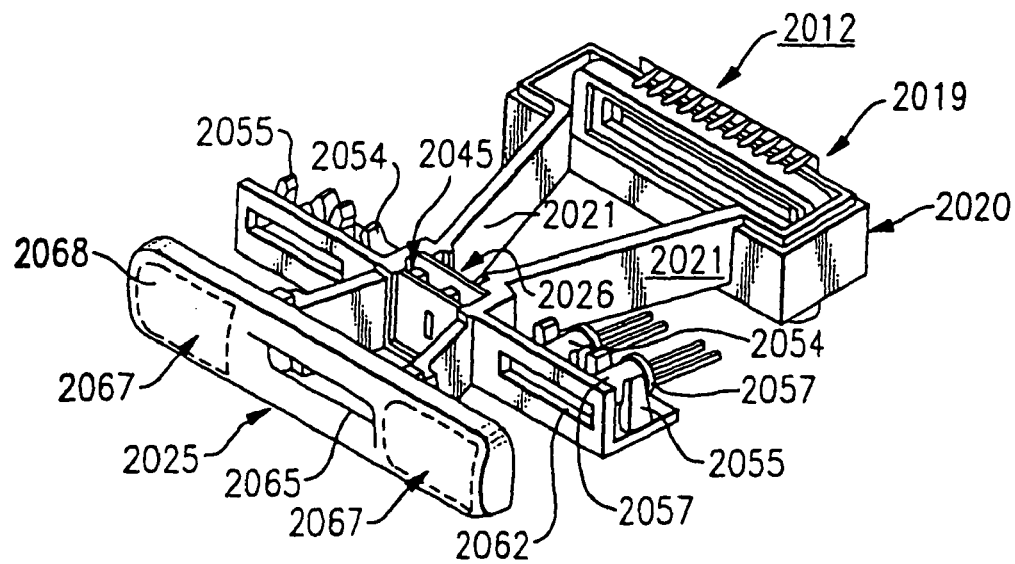
Figure 16:
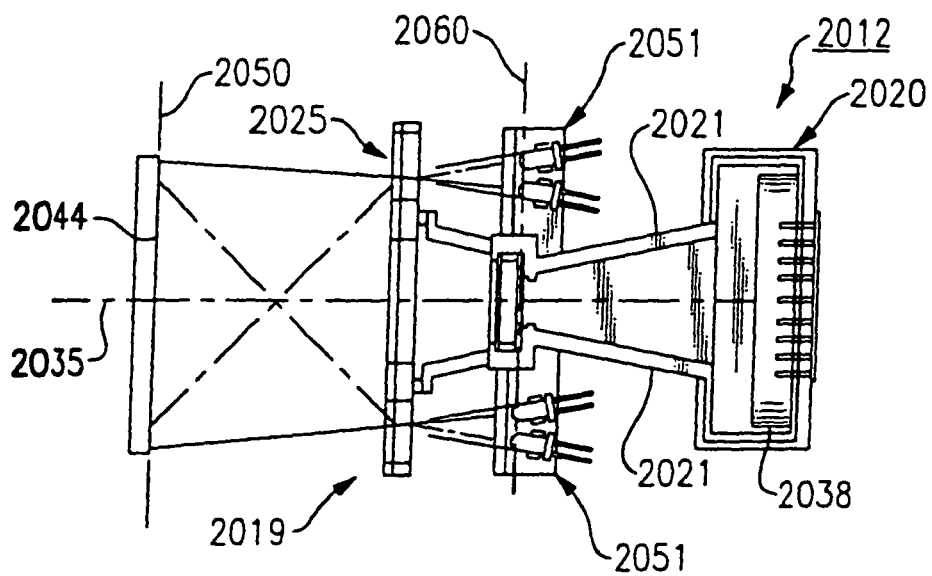

FIG. 14 is a perspective view of a hand-held barcode reader housing the optical assembly of the present invention;

FIG. 15 is an enlarged perspective view showing the optical assembly encompassing the teachings of the present invention;

FIG. 16 is a top plan view of the optical assembly illustrated in FIG. 15;

FIG. 17 is a slightly enlarged exploded view in perspective of the present optical assembly; and FIG. 18 is a perspective view showing the back of the half cylinder element.

[End of text excerpted from U.S. patent application Ser. No. 09/111,583 U.S. Pat. No. 6,164,544.]

DETAILED DESCRIPTION OF THE PREFERRED EMBODIMENT

An exemplary embodiment of an image sensor mounting system according to the invention is described with reference to the assembly drawing of FIG. 1. In this embodiment, a plate 10 is provided for back mounting an image sensor 12. In a simplified form of this mounting scheme, plate 10 is provided by a substantially rigid planar member comprising insulating material, image sensor 12 is mounted to plate 10 by any suitable means such as gluing or taping, and the resulting assembly comprising a plate and sensor 10 and 12 is mounted to an optical reader component frame 14 by inserting plate into a pocket 16 which may be defined, as is shown, by a pair of pins 18 and wall sections 20. Plate 10 is sized to a length $l_p$ such that the edges of plate 10 extend beyond the edges of sensor 12 when sensor 12 is attached to plate 10 to the end that a pocket 16 can hold an image sensor in a secure position by applying lateral holding forces to plate 10 without supplying lateral forces to the top glass, or bottom planar members of image sensor 12.

Component frame 14 in the example provided is an optical assembly component frame. Optical assembly frames of optical readers are typically comprised of molded plastic and are typically adapted to carry various optical system components of an optical reader. In addition to carrying an image sensor 12, an optical assembly frame of an optical reader may carry such components as mirrors, lenses, and illumination sources, such as LEDs. In most optical readers, an optical assembly component frame 14 is installed on a printed circuit board, e.g. circuit board 15 which, in addition to carrying frame 14, carries most, if not all, of the electrical components of the optical reader.

The mounting scheme described is advantageous over the prior art because it increases the security with which image sensor 12 is held in pocket 16 and furthermore, increases the precision with which a pixel plane to fixed point distance can be controlled.

While the total thickness, t, of stacked up image sensor 12 cannot be tightly controlled, the thickness $T_p$ of plate 10 can be tightly controlled. Accordingly, pockets 16 of several like designed optical assembly frames will apply relatively consistent holding forces to image sensors disposed therein.

The mounting system increases the precision with which pixel plane to fixed point distance, d, is controlled because it reduces the number of manufacturing tolerances which contribute to the distance, d, the distance between any fixed point, $P_p$, on the plane of a pixel array 12 and a fixed point, $P_s$, away from the pixel plane.

Figure 6:
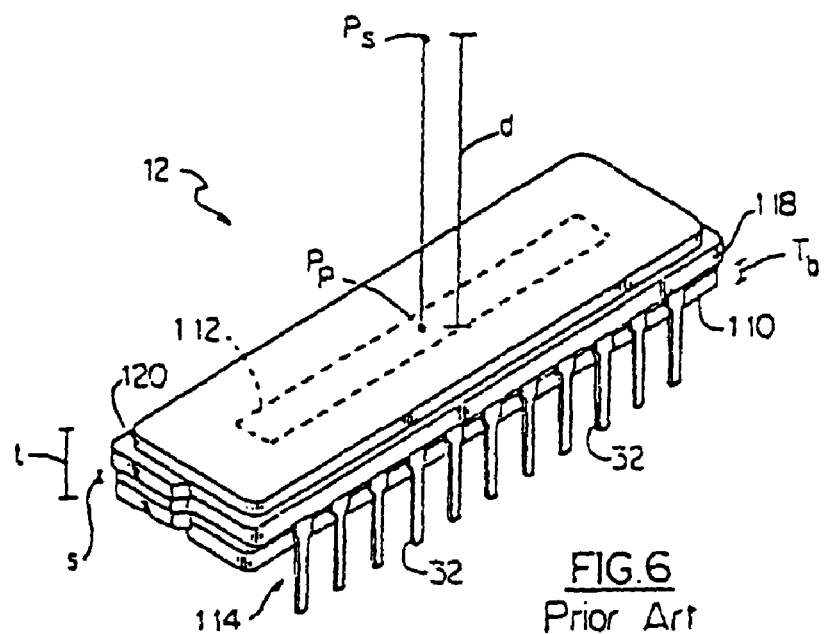
FIG. 6 is an exemplary perspective view of an image sensor chip illustrating a multilayered construction thereof.

In a prior art mounting system described with reference to FIGS. 6, 7, and 8, the pixel plane to fixed point distance, d, is a function of the total thickness, t, of an image sensor 10, which is a function of the highly variable top planar member to bottom planar member spacing, s.

Figure 1:
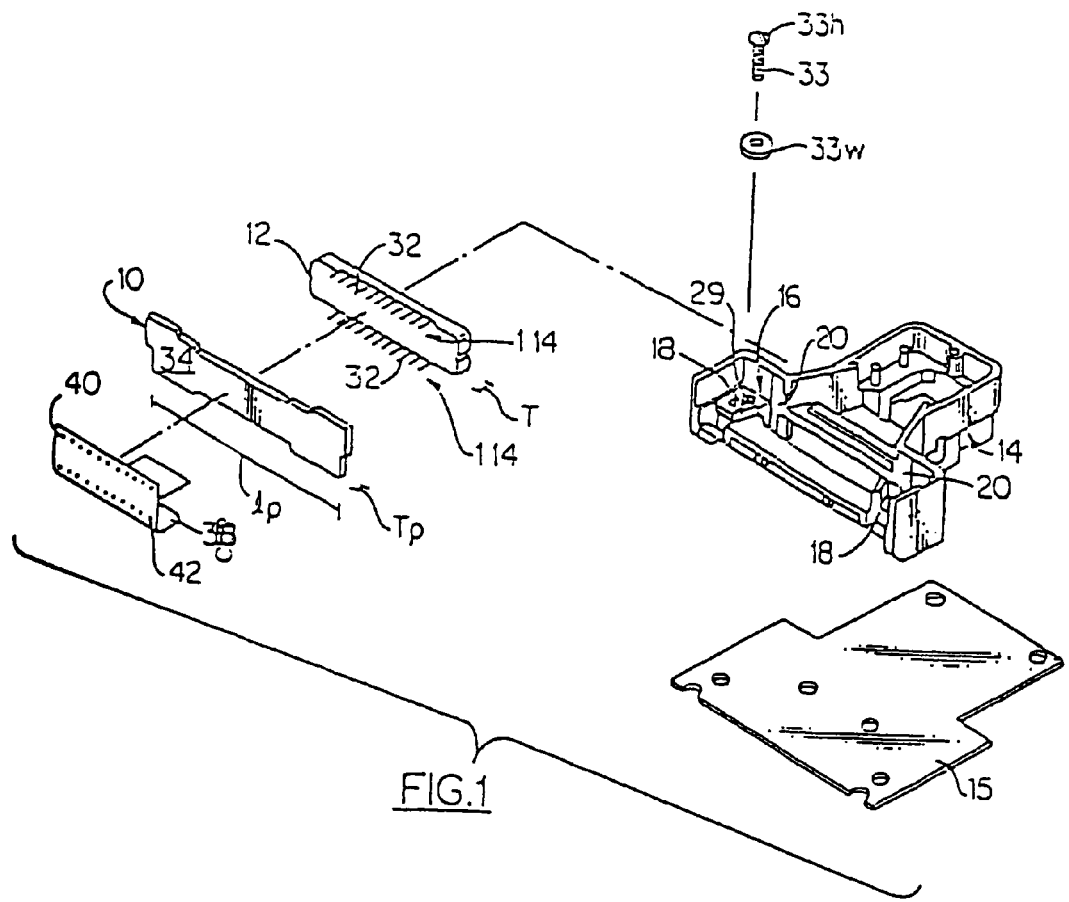
FIG. 1 is perspective assembly diagram illustrating assembly of a mounting system according to the invention.
Figure 2:
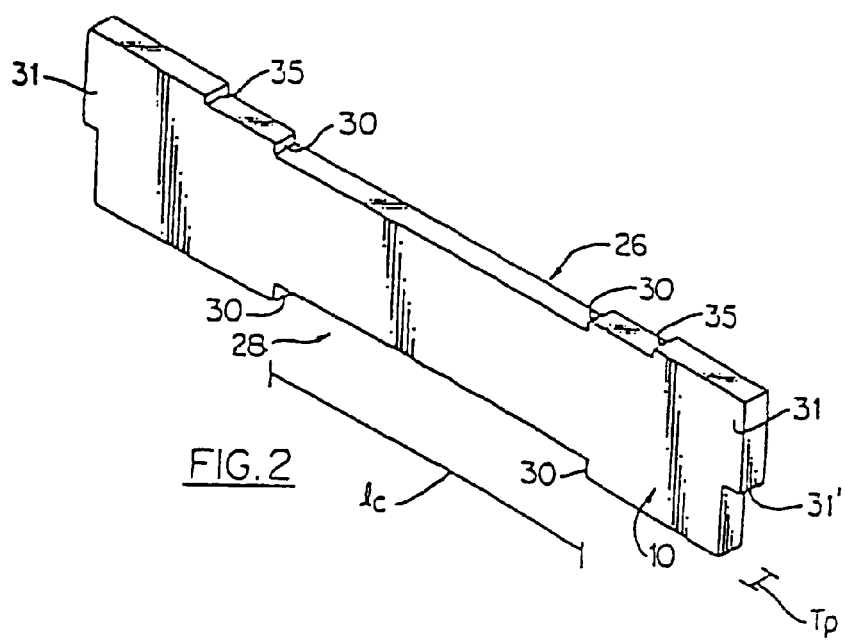
FIG. 2 is an enlarged perspective view of a mounting plate shown in FIG. 1.
Figure 3:
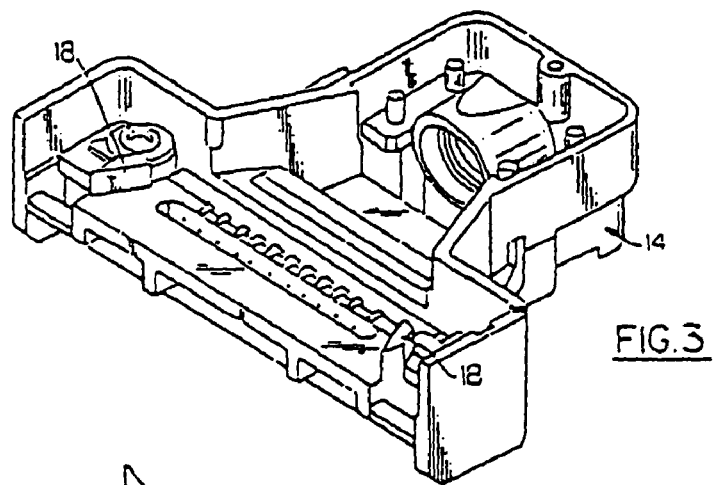
FIG. 3 is an enlarged perspective view of a component frame shown in FIG. 1.

Because a pixel plane of an image sensor 10 is disposed flush on a bottom planar member, it is seen that pixel plane to fixed point distance, d, in the mounting system of FIG. 1 is influenced only by the bottom plate thickness $t_b$, and the mounting plate thickness $t_p$, both of which can be tightly controlled.

Additional features can be incorporated in the mounting system thus far described for further improving the operation of the mounting system.

One enhancement to the mounting system thus far generally described is to form in mounting plate 10 first and second cutout sections 26 and 28. Cutout sections 26 and 28 defined by side walls 30 are sized to a length $l_c$ approximately the same length or slightly longer than lead frames 114 so that edges of lead frames 114 are benched on walls 30 when image sensor 10 is mounted on mounting plate 10. Cutout sections 26 and 28 provide the function of stabilizing the position of an image sensor on mounting plate 10 so as to prevent sliding or twisting of image sensor 12 on plate 10.

Another enhancement to the mounting system generally described relates to a mounting scheme for mounting an image sensor 12 to mounting plate 10. It has been mentioned herein that sensor 12 can be secured to plate 10 using any conventional securing means, such as adhesives, glues, double sided tapes, etc. However, such schemes for attachment have the potential drawback in that they add thickness to an assembly including an image sensor and a back plate.

In the image sensor to plate mounting scheme of FIG. 1 the mounting is accomplished without use of any thickness-adding material. As seen in FIG. 1, pins 32 will extend outwardly beyond the back surface 34 of plate 10 when sensor 12 is pressed flush against plate 10. A flex strip 38 which includes two strips 40 and 42 of pin receptacles for providing electrical connection between sensor leads 12 and certain electrical connectors of reader (normally on PCB), a distance away from sensor 12 may be attached to image sensor 12 such that first row of pins 32 are received in a first row of receptacles 40 and a second row of pins 32 are received in a second row of receptacles 42 of flex strip 39. Pins 32 can be soldered onto receptacles 40 and 42 such that the compression force of flex strip 38 impinging on mounting plate 10 to bias plate 10 against sensor 12 is sufficient to hold sensor 12 securely on plate 10 without additional securing forces supplied by glues, tape, or other adhesive material.

In the mounting system of FIG. 1, plate 10 may further include side wall formations 31 which are received in complementary formations of pocket 16. In particular, the mounting system can be configured such that bottom surface 31' of formation 31 is received on a complementary surface of pocket 16. Furthermore, when plate 10 is installed in pocket 16, at least one screw 33 can be received in at least one hole 29 formed in pocket 16, at least one screw 33 can be received in at least one hole 29 formed in pocket 16 in such a location that screw head 33h or associated washer 33w applies a vertical holding force to a received image sensor 12. In the particular embodiment shown, a cutaway section defined by walls 35 is provided so that plate 10 does not interfere with the receiving light optics in the particular optical system in the example provided.

Figure 4A:
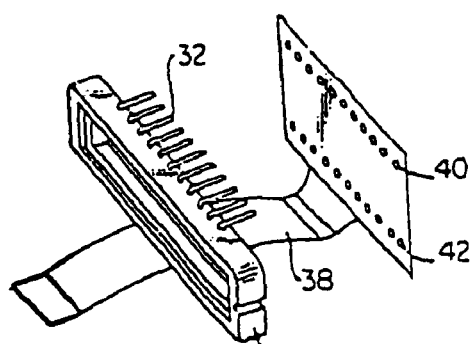
FIG. 4a is a perspective partial assembly diagram illustrating assembly of a flex strip onto an image sensor.

A variation on the mounting schemes described thus far is described with reference to FIG. 4a through FIG. 5. In the schemes described thus far, image sensor 12 is mounted to a plate 10 which, in turn, is received in a pocket 16 in an optical assembly frame 14 of a bar code reader.

Figure 4B:
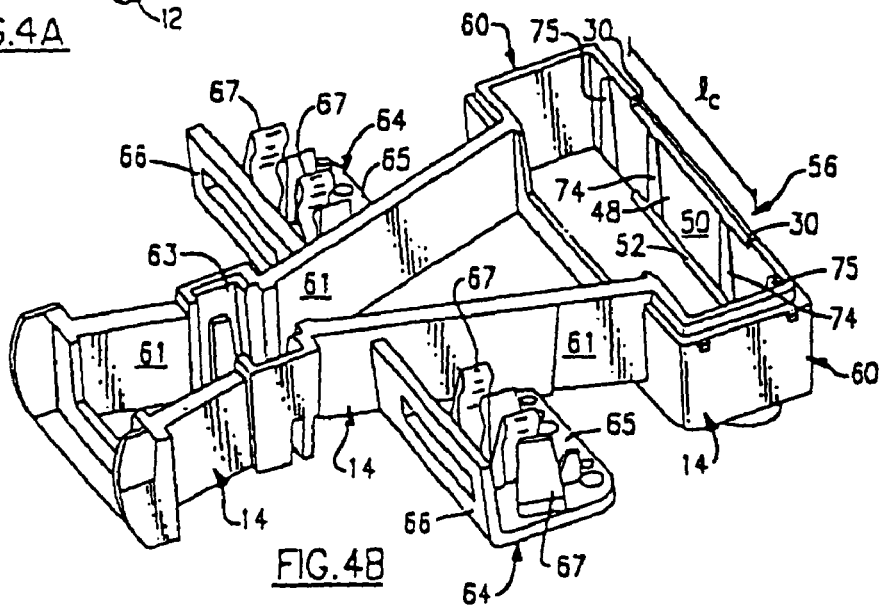
FIG. 4b is a perspective view illustrating an example of a component frame having an integrated back plate for receiving an image sensor.

In the mounting scheme described with reference to FIGS. 4a, 4b, and 5, the mounting pocket 16 of optical assembly frame 14 is deleted, and optical assembly frame 14 instead is furnished with a back plate 48 integral with frame 14 which provides essentially the same function as mounting plate 10. Certain figures of an optical system which may be incorporated in a frame of the type shown in FIG. 4b and FIG. 5 are described in detail in copending applications entitled "Optical Assembly for Barcode Scanner," Ser. No. 09/111,476, filed Jun. 8, 1998, now U.S. Pat. No. 6,119,939, and "Adjustable Illumination System for a Barcode Scanner," Ser. No. 09/111,583, also filed Jun. 8, 1998, now U.S. Pat. No. 6,164,544, concurrently herewith, incorporated by reference herein, and assigned to the Assignee of the present invention.

Figure 5:
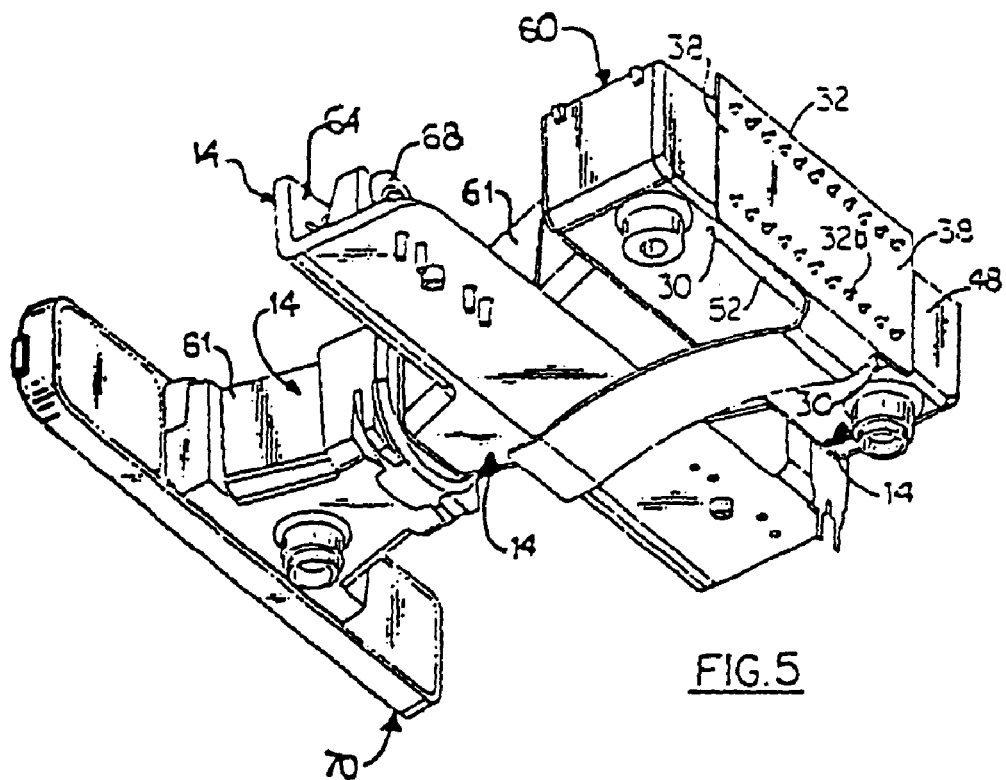
FIG. 5 a second perspective view of the component frame of FIG. 4b showing an image sensor installed thereon according to a mounting system of the invention.

As shown and described in greater detail in the above applications, frame 14 as shown in FIGS. 4b and 5 is a single piece frame which includes a rectangular-shaped housing 60 partially delimited by back plate 48 and a pair of forwardly extended wall-shaped arms 61. Received at the distal end of arms 61 is an elongated single piece optical element 70. Frame 14 receives a lens assembly such as a lens card (not shown) in a lens assembly guideway 63 delimited by wall-shaped arms 61. Guideway 63 is formed at a neck of frame 14 characterized by a relatively narrow spacing between well-shaped arms 61. Laterally extending from arms 61 of single piece frame 14 are a pair of lamp brackets 64. Each lamp bracket 64 includes a platform 65 and a front aperture wall 66. Each platform 65 includes a pair of LED receiving clips 67 on which LEDs 68 are received.

In this mounting scheme, image sensor 12 is mounted directly to back plate 48 in essentially the same manner that sensor 12 is mounted to mounting plate 10 in the general scheme described previously.

In mounting sensor 12 to back plate 48 then sensor 12 is pressed against surface 50 of back plate 48. In the specific example of FIG. 4b, it is seen that surface 50 may include spaced apart image sensor receiving ribs 75 and 75. When present, receiving surfaces of outer ribs 75 receive outer ends of a back surface of image sensor 12 while receiving surfaces of inner ribs 74 receive an inner region of a back surface of image sensor 12. Frame 14 includes elongated aperture 52 defined by side walls 30 of back plate 48, frame 14 and by a bottom edge of back plate 48, as is seen in FIG. 4b and FIG. 5, to accommodate bottom pins 32b of lead frame 114 when sensor 10 is mounted against back plate 48. Securing material such as glues, tapes, or other adhesives may be provided to aid in the securing of an image sensor 12 against back plate 48. In the alternative, image sensor 12 may be secured to back plate 48 as described previously by a compression force supplied by flex strip 38, which when soldered, works to bias image sensor 12 against plate 48.

Cutout section 56 and aperture 52 can be sized to have lengths $l_c$ approximately equal to the respective lengths of lead frames 14 so that sidewall 30 of aperture 52 and of cutaway section 56 operate to bench lead frames 114 and to thereby prevent sliding or twisting of image sensor 12 when image sensor 12 is mounted on back plate 48. It will be seen that a back plate of the invention can be provided by virtually any substantially planar rigid surface integrated onto a mounted component frame.

[The following is text excerpted from U.S. patent application Ser. No. 09/111,426, U.S. Pat. No. 6,119,939.]

Turning initially to FIG. 9, there is shown a hand-held long-range barcode scanner 1010 that houses the optical assembly 1012 of the present invention. The scanner includes a handle 1013 that can be easily grasped and held by the user so that the scanner can be rapidly trained upon a barcode target situated some distance from the user. The scanner further includes a contoured reader head 1014 mounted on the top of the handle and a trigger 1015 for activating the scanner. The scanner preferably is a light-weight, truly portable device that can be easily held and carried about without tiring the user. Accordingly, the reading components of the instrument must be compact, yet easily assembled, aligned and installed within the reader head. As will be explained in detail below, the apparatus of the present invention provides all these advantages while at the same time, delivering an extremely sharp, well-defined line of illumination in barcode space that can be accurately read by a solid state imager.

With further reference to FIGS. 10-13, the optical assembly 1012 embodying the teachings of the present invention includes a single piece frame 1019 molded from high strength light-weight plastic. The frame further includes a rectangular-shaped housing 1020 and a pair of forwardly extended arms 1021-1021. The arms, as viewed from above, in FIG. 11 are in an X configuration with an elongated optical element 1025 mounted at the distal end of the arms, the function of which will be explained in greater detail below.

A lens card 1026 (FIG. 13) is slidably received within a vertically disposed guideway 1027 located at the neck formed by the arms. The lens card is molded from a single material and includes a flat lens holder 1028 surrounding a single imaging lens 1030. The bottom surface 1031 of the holder is arcuate-shaped and adapted to seat within a complimentary groove situated in the bottom of the guideway. A pair of tabs 1032-1032 are carried on the front face of the lens holder which, in assembly, rests on the top surface of stanchions 1033, which form the front rails of the guideway. The tab serves to locate the imaging lens within the frame and prevents the lens card from being inserted into the frame in an inverted position.

Once properly mounted in the frame, the imaging lens defines the optical axis 1035 (FIG. 11) of the system. A solid state within a support 1038 and is coupled to a flexible ribbon connector 1039 by a series of leads 1040 mounted along the top apron 1041 of the support. The support is passed downwardly into the housing against spaced apart locating ribs 1042a and 1042b molded into the back wall of the housing, and is seated upon the floor 1043 of the housing. When the imager assembly is received by the back wall, it is seen that receiving surfaces of outer ribs 1042a receive outer regions of a back surface of support 1038 while receiving surfaces of inner ribs 1042b receive a middle region of a back surface of support 1038. The solid state imager is aligned within the housing so that it is centered upon the optical axis of the system a given distance from the imaging lens so that an image of a target 1044 in barcode space is focused upon the image recording surface of the imager by the imaging lens. A system for mounting an image sensor in an imaging device is described in detail in a copending application Ser. No. 09/112,028 (now U.S. Pat. No. 6,275,388) entitled "Image Sensor Mounting System" filed Jul. 8, 1998, assigned to the Assignee of the present invention, and incorporated herein by reference.

An aperture card 1045 is slidably contained within a second guideway 1047 positioned in front of the first guideway at the neck of the "X" shaped arms. The aperture card contains a vertically-extended stop aperture 1048 that is centered upon the horizontal optical axis of the system. When the card is mounted in the guideway, the vertical oriented long dimension of the aperture is arranged so that the long dimension is parallel to the longer dimension of a one-dimensional (ID) barcode target situated in the object plane 1050 of the imaging lens.

The terms horizontal and vertical are used herein with respect to relative locations of various components of the optical system and not necessary as to the exact location of the components in space.

A pair of lamp brackets 1051-1051 are mounted on either side of the frame at the neck. Each bracket is of similar construction and includes a platform 1053 and a front wall 1054. As best illustrated in FIG. 13 each platform has a pair of clips 1054 and 1055 mounted thereon that are perpendicularly aligned with the optical axis of the system. A light emitting diode (LED) 1057 is mounted in each clip so that the distal end of each lamp lies substantially within the plane 1060 (FIG. 11) described by the imaging lens to furnish the system with what is known as coplanar illumination.

The front wall 1034 of each lamp bracket contains a horizontally disposed field stop 1062 that is positioned immediately in front of the LEDs preferably almost in contact with the lamps. Body portions of LEDs 1057 of each bracket define inner and outer boundary lines 1074 and 1075. It is seen that LEDs 1057 are disposed so that boundary lines 1074 and 1075 of each bracket extend through aperture 1062.

The elongated optical element 1025 mounted at the distal end of the frame arms is shown in greater detail in FIGS. 12 and 13. The optical element is formed of an elongated semi-circular shaped piece of optical glass having a rectangular-shaped opening 1065 centrally formed therein. The opening is of a size and shape such that an image of a target in barcode space can freely pass optically undisturbed as it moves along unfolded receive the optical axis 1035 of the system.

Cylindrical lens elements 1067-1067 are located on either side of the opening through which illumination from the LEDs pass. Each cylindrical lens images the field stop in barcode space to produce a sharp horizontal line of illumination at the target. A single axis diffuser 1070-1070 is located at the plano light entrance face of each cylindrical lens, which serve to homogenize the light in a horizontal plane and thus causes the light energy to be uniformly distributed within the target area. The diffuser can be either a gradient or a non-gradient diffuser. Preferably, a gradient diffuser is employed having 5< of diffusion at its outer edge, and 40< of diffusion at its inner edge.

The LEDs mounted in the inboard clips 1054 of each lamp bracket is canted at an angle with respect to the optical axis so that the light beam from the lamps is directed to one outer side edge of the target region. The lamps mounted in the outboard clips 1055 are similarly canted to direct the light beams from the outboard lamps toward the center of the target region. The positioning of the lamps along with the use of a single axis diffuser and a field stop apparatus serves to create a sharp uniform line of light across the barcode target that can be accurately recorded by the CCD imager.

As illustrated in FIG. 13, the distal end of each arm of the frame contains an arcuate-shaped camming surface 1071 that lies in a vertical plane that is parallel with the optical axis of the system. The camming surfaces are received in complimentary cut-outs 1074 formed in the piano back surface of the optical element 1025 with the cut-outs being centered upon the center line of 1080 of the optical element 1025. Preferably, each camming surface describes arc segments of a circle about which the cylindrical illumination lenses carried by the elongated optical element 1025 can be rotatably adjusted within the plane described by the arc segments. The center of curvature of the camming surfaces are coincident with the center of curvature of the front surface 1068 of the optical element 1067. Accordingly, the illuminator lenses can be adjusted about the arc segments so that the line of illumination that is produced is coincident with the object plane of the imaging lens. As can be seen, a slight rotation of the element about the camming surface will angularly offset the piano entrance face of the two cylindrical lenses with respect to the axis of the incoming light beam, thus altering the position of the line of light produced in the plane of the barcode target. Accordingly, during assembly of the optical reader components on the frame, the line of illumination can be easily and accurately adjusted in barcode space. Once adjusted the optical element is permanently locked in place by ultrasonically welding the optical element to the frame. Any other means for holding the optical element 1025 in a desired position within the frame may be similarly employed without departing from the teachings of the present invention.

One example of an optical assembly suitable for use in a barcode reader involves a single element plastic lens having a focal length of approximately 30 mm.

The lens is positioned approx 39 mm in front of a linear array CCD, so an image of a target in barcode space is formed at the image plane of the lens at a magnification of approx ⅓.₅×. The aperture stop of the lens can be either elliptical or rectangular in shape, having an aspect ratio of at least 3:1 and preferably 6.0 or 8:1. The longer dimension of the aperture is oriented vertically, so the long dimension of the aperture is parallel to the longer dimension of a ID barcode. The CCD of choice is a chip developed specifically for barcode reading, the photosensitive elements (pixels) having a 25:1 aspect ratio. Again, the longer dimension of the pixels will be aligned parallel to the barcode.

The illumination system consists of four LEDs in standard T 13/4 packages. Two LEDs will be arrayed on either side of the imaging lens. The LEDs will lie in the same plane as the imaging lens, to provide coplanar illumination. In front of the LEDs, almost in contact with them, is a field stop. The field stop is simply a horizontal slit having a height of about =0.040 to 0.050". The field stop is imaged into barcode space by a cylindrical lens having a focal length of about 25 mm. The magnification of the cylinder lens is approx 6×, so the result is a sharp horizontal line, 0.24" to 0.36" in height. Also included in the illumination system is a single axis diffuser, located in contact with the cylinder lens. This diffuser serves to homogenize the light in the horizontal plane, improving the uniformity of the distribution of the light.

[End of text excerpted from U.S. patent application Ser. No. 09/111,426, U.S. Pat. No. 6,119,939.]

[The following is text excerpted from U.S. patent application Ser. No. 09/111,583 U.S. Pat. No. 6,164,544.]

Turning initially to FIG. 14, there is shown a hand-held long-range barcode scanner 2010 that houses the optical assembly 2012 of the present invention. The scanner includes a handle 2013 that can be easily grasped and held by the user so that the scanner can be rapidly trained upon a barcode target situated some distance from the user. The scanner further includes a contoured reader head 2014 mounted on the top of the handle and a trigger 2015 for activating the scanner. The scanner preferably is a light-weight, truly portable device that can be easily held and carried about without tiring the user. Accordingly, the reading components of the instrument must be compact, yet easily assembled, aligned and installed within the reader head. As will be explained in detail below, the apparatus of the present invention provides all these advantages while at the same time, delivering an extremely sharp, well-defined line of illumination in barcode space that can be accurately read by a solid state imager.

With further reference to FIGS. 15-18, the optical assembly 2012 embodying the teachings of the present invention includes a single piece frame 2019 molded from high strength light-weight plastic. The frame further includes a rectangular-shaped housing 2020 and a pair of forwardly extended arms 2021-2021. The arms, as viewed from above, in FIG. 16 are in an X configuration with an elongated optical element 2025 mounted at the distal end of the arms, the function of which will be explained in greater detail below.

A lens card 2026 (FIG. 18) is slidably received within a vertically disposed guideway 2027 located at the neck formed by the arms. The lens card is molded from a single material and includes a flat lens each of 2028 surrounding a single imaging lens 2030. The bottom surface 2031 of the holder is arcuate-shaped and adapted to seat within a complimentary groove situated in the bottom of the guideway. A pair of tabs 2032-2032 are carried on the front face of the lens holder each of which, in assembly, rests on the top surface of stanchions 2033, the stanchions forming the front rails of the guideway. The tab serves to locate the imaging lens within the frame and prevents the lens card from being inserted into the frame in an inverted position.

Once properly mounted in the frame, the imaging lens defines the optical axis 2035 (FIG. 16) of the system. A solid state image sensor or imager 2037, which preferably is a charge coupled device (CCD), is mounted within a support 2038 and is coupled to a flexible ribbon connector 2039 by a series of leads 2040 mounted along the top apron 2041 of the support. The support is passed downwardly into the housing against locating ribs 2042-2042 molded into the back wall of the housing, and is seated upon the floor 2043 of the housing. The solid state imager is aligned within the housing so that it is centered upon the optical axis of the system a given distance from the imaging lens so that an image of a target 2044 in barcode space is focused upon the image recording surface of the imager by the imaging lens. A system for mounting an image sensor in an imaging device is described in detail in a copending application entitled "Image Sensor Mounting System" filed concurrently herewith, assigned to the Assignee of the present invention, and incorporated herein.

An aperture card 2045 is slidably contained within a second guideway 2047 positioned in front of the first guideway at the neck of the "X" shaped arms. The aperture card contains a vertically-extended stop aperture 2048 that is centered upon the horizontal optical axis of the system. When the card is mounted in the guideway, the vertical orientated long dimension of the aperture is arranged so that the long dimension is parallel to the longer dimension of a one-dimensional (ID) barcode target situated in the object plane 2050 of the imaging lens.

The terms horizontal and vertical are used herein with respect to relative locations of various components of the optical system and not necessary as to the exact location of the components in space.

A pair of lamp brackets 2051-2051 are mounted on either side of the frame at the neck. Each bracket is of similar construction and includes a platform 2053 and a front wall 2054. As best illustrated in FIG. 15 each platform has a pair of clips 2054 and 2055 mounted thereon that are perpendicularly aligned with the optical axis of the system. A light emitting diode (LED) 2057 is mounted in each clip so that the distal end of each lamp lies substantially within the plane 2060 (FIG. 16) described by the imaging lens to furnish the system with what is known as coplanar illumination.

The front wall 2034 of each lamp bracket contains a horizontally disposed field stop 2062 that is positioned immediately in front of the LEDs preferably almost in contact with the lamps.

The elongated optical element 2025 mounted at the distal end of the frame arms is shown in greater detail in FIGS. 17 and 18. The optical element is formed of an elongated semicircular shaped piece of optical glass having a rectangular-shaped opening 2065 centrally formed therein. The opening is of a size and shape such that an image of a target in barcode space can freely pass optically undisturbed as it moves along the optical axis 2035 of the system.

Cylindrical lens elements 2067-2067 are located on either side of the opening through which illumination from the LEDs pass. Each cylindrical lens images the associated field stop in barcode space to produce a sharp horizontal line of light at the target. A diffuser is mounted at the light entrance face of each illumination lens element. The diffuser can be either a gradient or a non-gradient diffuser. Preferably, a gradient diffuser is employed having 5< of diffusion at its outer edge and 40< of diffusion at its inner edge.

The LEDs mounted in the inboard clips 2054 of each lamp bracket is canted at an angle with respect to the optical axis so that the light beam from the lamps is directed to one outer side edge of the target region. The lamps mounted in the outboard clips 2055 are similarly canted to direct the light beams from the outboard lamps toward the center of the target region. The positioning of the lamps along with the use of a single axis diffuser and a field stop aperture severs to create a sharp uniform line of light across the barcode target that can be accurately recorded by the CCD imager.

As illustrated in FIG. 14, the distal end of each arm of the frame contains an arcuate shaped camming surface 2071 that lies in a vertical plane that is parallel with the optical axis of the system. The camming surfaces are received in complimentary cut-outs 2074 formed in the plano back surface of the optical element 2025 with the cut-outs being centered upon the center line of 2080 of the optical element 2025. Preferably, each camming surface describes an arc of a circle about which the cylindrical illuminating lenses carried by the elongated optical element can be rotatably adjusted within a plane. The center of curvature of the camming surfaces are coincident with the center of curvature of the front surface 2068 of the optical element 2067. Accordingly, the illumination lenses can be rotatably adjusted so that the line of illumination that is produced is coincident with the object plane of the imaging lens. As can be seen, a slight rotation of the element along the camming surface will angularly offset the plano entrance face of the two illumination lens elements with respect to the axis of the incoming light beam, thus altering the position of the line of light produced in the plane of the barcode target. Accordingly, during assembly of the optical reader components on the frame, the line of illumination can be easily and accurately adjusted in barcode space. Once adjusted, the optical element is permanently held in place by ultrasonically welding the optical element to the frame. Any other means for holding the optical element 2025 in a desired position within the frame may be similarly employed without departing from the teachings of the present invention.

One example of an optical assembly suitable for use in a barcode reader involves a single element plastic lens having a focal length of approximately 30 mm.

The lens is positioned approx 39 mm in front of a linear array CCD, so an image of a target in barcode space is formed at the image plane of the lens at a magnification of approx $\frac{1}{3.5}\times$. The aperture stop of the lens can be either elliptical or rectangular in shape, having an aspect ratio of at least 3:1 and preferably 6.0 or 8:1. The longer dimension of the aperture is oriented vertically, so the long dimension of the aperture is parallel to the longer dimension of a ID barcode. The CCD of choice is a chip developed specifically for barcode reading, the photosensitive elements (pixels) having a 25:1 aspect ratio. Again, the longer dimension of the pixels will be aligned parallel to the barcode.

The illumination system consists of four LEDs in standard T 13/4 packages. Two LEDs will be arranged on either side of the imaging lens. The LEDs will lie in the same plane as the imaging lens, to provide coplanar illumination. In front of the LEDs, almost in contact with them is a field stop. The field stop is simply a horizontal slit having a height of about =0.040 to 0.050". The field stop is imaged into barcode space by a cylindrical lens having a focal length of about 25 mm. The magnification of the cylinder lens is approx 6x, so the result is a sharp horizontal line, 0.24" to 0.36" in height. Also included in the illumination system is a single axis diffuser, located in contact with the cylinder lens. This diffuser serves to homogenize the light in the horizontal plane, improving the uniformity of the distribution of the light.

[End of text excerpted from U.S. patent application Ser. No. 09/111,583 U.S. Pat. No. 6,164,544.]

According to its major and broadly stated the present invention is a mounting system for mounting an image sensor chip in a location in a device apart from a PCB board.

In one embodiment of the invention, a multilayered image sensor is back mounted to a plate, and the plate in turn, is installed in a holding pocket of a device. In that the scheme takes advantage of a high controllability of a mounting plate's thickness, the mounting scheme improves the consistency of holding forces with which several image sensors are secured in like configured imaging devices. In that the scheme provides for back mounting of image sensor on a plate, the mounting system reduces fluctuations in pixel plane to fixed point distances.

The mounting scheme may be enhanced by forming cutout sections in the mounting plate. The cutout sections serve to bench lead frames extending from an image sensor, and thereby service to minimize sliding or twisting of an image sensor mounted on a mounting plate. In another enhancement, an image sensor mounted on a mounting plate is secured to the plate entirely by a compression force supplied by a flex strip, soldered onto an image sensor's lead frames, impinging on the mounting plate. This arrangement serves to further minimize thickness variations resulting from manufacturing tolerances.

In a variation of the invention, the mounting plate is substituted by a back plate formed integral with a component frame of a device. The back plate along with the remainder of the frame define an elongated aperture adapted to receive a lead frame of an image sensor. An image sensor may be mounted to a back plate in essentially the same way that an image sensor is mounted to a mounting plate to the end that an image sensor is tightly secured in a device and further to the end that pixel plane to fixed point distance is tightly controlled.

These and other details, advantages, and benefits of the present invention will become apparent from the detailed description of the preferred embodiment herein below. There is described an optical assembly which can be for use in an optical reader. In one embodiment, the optical assembly can include a support and a light source.

[The following is text excerpted from U.S. patent application Ser. No. 09/111,426, U.S. Pat. No. 6,119,939.]

It is, therefore, a primary object of the present invention to improve barcode readers.

A further object of the invention is to improve hand-held barcode scanners for long range illumination and reading of a barcode target.

A still further object of the present invention is to improve optical devices for use in barcode scanners which are capable of producing a sharply defined line of illumination in barcode space using light emitting diodes.

Another object of the present invention is to simplify the assembly of barcode readers using coplanar light emitting diode illumination systems.

Yet another object of the present invention is to provide a single molded frame for holding and positioning the components of a barcode reader.

Yet a further object of the present invention is to more effectively utilize the light emitted by LEDs in a barcode scanner.

These and other objects of the present invention are attained by means of an optical assembly for use in a barcode reader that includes a molded support frame having a rear housing and a pair of arms outwardly extending from the front of the housing. A solid state imager is contained in the housing and an imaging lens is slidably contained between the arms in a rear guideway for focusing an image in barcode space along an optical axis onto the image recording surface of the solid state imager. An aperture card is also slidably contained between the arms in a second front guideway. The aperture card has a vertically disposed stop aperture which is centered about the optical axis of the system. A lamp support unit is mounted on the arms on either side of the imaging lens. Each unit contains a pair of light emitting diodes that are in coplanar alignment with the imaging lens and a horizontally disposed field aperture positioned in front of the light emitting diodes. A single horizontally extended half cylinder optical element is mounted at the distal end of the two arms so that the optical element is centered upon the optical axis of the system with the piano surface facing the imaging lens in perpendicular alignment with the optical axis. An opening is formed in the center of the optical element through which an image of a barcode target can pass optically undisturbed. The outer ends of the optical element form cylindrical lenses for magnifying and focusing the light passing through the two stop apertures in barcode space. A single axis diffuser is positioned at the plano surface of each cylindrical lens which distributes the light from the LEDs horizontally and homogenizes the light across the barcode target area.

[End of text excerpted from U.S. patent application Ser. No. 09/111,426, U.S. Pat. No. 6,119,939.]

[The following is text excerpted from U.S. patent application Ser. No. 09/11,583 U.S. Pat. No. 6,164,544.]

It is, therefore, a primary object of the present invention to improve barcode readers.

A further object of the invention is to improve hand-held barcode scanners for long range illumination and reading of a barcode target.

A still further object of the present invention is to improve optical devices for use in barcode scanners which are capable of producing a sharply defined line of illumination in barcode space using light emitting diodes.

Another object of the present invention is to provide apparatus for positioning illumination within a desired location in barcode space.

These, and other objects of the present invention, are attained by an apparatus for adjusting the position of a line of light in barcode space that includes a support frame having a rear housing containing a solid state imager and a pair of support arms extending forwardly from the front of the housing. An imaging lens is mounted between the arms for focusing an image of a target in barcode space upon the solid state imager along the optical axis of the imaging lens. Illuminating LEDs are mounted on either side of the imaging lens for illuminating the target. The illumination is passed through a pair of cylindrical lenses that are adjustably mounted upon the distal ends of the arms so that the light can be selectively positioned in barcode space.

[End of text excerpted from U.S. patent application Ser. No. 09/111,583 U.S. Pat. No. 6,164,544.]

While the present invention has been particularly shown and described with reference to the preferred mode as illustrated in the drawing, it will be understood by one skilled in the art that various changes in detail may be effected therein without departing from the spirit and scope of the invention as defined by the claims.

The invention claimed is:

1. A method for constructing an optical assembly for use in an optical reader having a receive optical axis, comprising the steps of:
   providing a support frame having a rear housing supporting a solid state imager;
   disposing a first light unit and a second light unit on the support frame on either side of the receive optical axis;
   providing a first field stop optically forward of the first light unit and a second field stop optically forward of the second light unit; and
   providing a single piece optical element having a center aperture centered on the receive optical axis of the optical reader on said support frame so that the single piece optical element is disposed optically forward of the first field stop and the second field stop.

2. The method of claim 1, further comprising the step of molding the support frame as a single piece.

3. The method of claim 1, wherein the single piece optical element includes two cylindrical lens elements each having a single axis diffuser.

4. The method of claim 1, further comprising the step of disposing the first light unit and the second light unit so that each of the first light unit and the second light unit define inner and outer boundary lines, and so that said boundary lines extend without interruption through the first field stop and the second field stop, respectively.

5. The method of claim 4, wherein the first light unit and the second light unit are disposed so that each of the first light unit and the second light unit is canted.

6. The method of claim 1, wherein each of the first light unit and the second light unit comprises a plurality of light emitting diodes (LEDs).

7. The method of claim 1, wherein said providing step includes the steps of providing a support frame having an integrated back plate and mounting said solid state imager to said back plate.

8. The method of claim 1, wherein said providing step includes the step of providing a support frame having an integrated back plate that includes first and second lead-receiving openings, each having a length approximately equal to a length of leads of said solid state imager to prevent at least one of sliding or twisting of leads of said solid state imager when said leads are received in said lead-receiving openings.

9. The method of claim 8, wherein said providing step includes the step of providing a support frame having an integrated back plate for receiving said solid state imager, and having first and second lead receiving openings through which leads of said solid state imager extend, the method further including the step of biasing said solid state imager against said back plate using securing material selected from the group consisting of glues and tapes.

10. The method of claim 8, wherein said providing step includes the step of providing a support frame having an integrated back plate for receiving said solid state imager, and having first and second lead receiving openings through which leads of said solid state imager extend, the method further including the step of biasing said solid state imager against said back plate by connecting a flex strip to said leads without additional securing forces supplied by adhesive material.

11. The method of claim 1, wherein said providing step includes the step of providing a support frame having an integrated back plate that includes first and second lead-receiving openings, each having sidewalls for benching leads of said solid state imager.

12. A method of constructing an optical assembly for use in an optical reader comprising the steps of:
providing a support frame;
disposing a plurality of clips on said support frame;
inserting a plurality of lamps into said plurality of clips, the plurality of lamps including a first lamp and a second lamp;
disposing a first field stop optically forward of the first lamp and disposing a second field stop optically forward of the second lamp; and
disposing an optical element defining a center aperture centered on a receive optical axis of the optical reader on said support frame so that the optical element is disposed optically forward of the first field stop and the second field stop.

13. The method of claim 12, further comprising the step of disposing an imager assembly on said support frame.

14. The method of claim 13, wherein the imager assembly comprises a linear array charge coupled device (CCD), and wherein said optical element is a single piece optical element.

15. The method of claim 12, wherein each field stop comprises a horizontal slit having a height of between about 0.40 inches to about 0.50 inches.

16. A method of assembling an illumination package for an optical reader including the steps of:
providing a support having a forward receiving surface;
positioning a forwardly projecting light source on said support;
adjustably positioning a lens on said forward receiving surface such that said light source passes there through and is focused at a point in space;
adjusting the position of said lens on said forward receiving surface so that said light source is focused on a desired point in space; and
then securing said lens to said forward receiving surface.

17. An optical assembly for use in a reader, the optical assembly comprising:
a support frame;
a solid state imager;
imaging optics supported by said support frame and defining an optical axis, the imaging optics for focusing a target image upon the solid state imager;
a first light source;
a second light source;
wherein there is defined by the optical assembly a first horizontally extending field stop aperture, wherein there is further defined by the optical assembly a second horizontally extending field stop aperture,
wherein the first horizontally extending field stop is positioned in front of the first light source, and wherein the second horizontally extending field stop is positioned in front of the second light source;
a single optical element supported by the support frame and being of elongated shape, the single optical element having a first outer end and a second outer end, the single optical element being disposed so that light from the first light source and from the second light source is transmitted through the single optical element;
wherein the single optical element has an opening, the single optical element being disposed so that an image of a target can pass optically undisturbed through the opening; and
wherein the single optical element includes a surface extending in perpendicular alignment with the optical axis.

18. The optical assembly of claim 17, wherein first outer end and the second outer end include light exit surfaces, the light exit surfaces being horizontally extending convex cylindrical light exit surfaces.

19. The optical assembly of claim 17, wherein a light entry surface of the first outer end is adapted so that light transmitted through the single optical element is redirected in a horizontal plane.

20. The optical assembly of claim 17, wherein a light entry surface of the first outer end is adapted so that light transmitted through the single optical element is redirected in a horizontal plane, the light entry surface being adapted so that light entering the light entry surface relatively nearer the optical axis is redirected differently than light entering the light entry surface relatively farther from the optical axis.

21. The optical assembly of claim 20, wherein the light entry surface of the first outer end includes a diffuser.

22. The optical assembly of claim 17, wherein the single optical element includes a light entry surface extending in perpendicular alignment with the optical axis.

23. The optical assembly of claim 17, wherein members of a support structure defining the first horizontally extending slit aperture and the second horizontally extending slit aperture are in perpendicular alignment with the optical axis.

24. The optical assembly of claim 17, wherein the imaging optics is provided by a single imaging lens.

25. The optical assembly of claim 17, wherein the support frame includes a camming surface and wherein the single optical element includes a complementary cutout for receiving the camming surface, wherein for assembly of the optical assembly, the single optical element is rotated about an arc defined by the camming surface and then ultrasonically welded.

26. The optical assembly of claim 17, wherein the single optical element includes a first surface for redirecting light in a horizontal direction and a second surface for redirecting light in a vertical direction.

27. The optical assembly of claim 26, wherein the first surface is a light entry surface and the second surface is a light exit surface.

28. The optical assembly of claim 17, wherein solid state imager includes a first lead frame and a second lead frame, and wherein the support frame includes an insulating back plate accommodating the first lead frame, the back plate having cutout sections accommodating the second lead frame, the opening and the cutout sections preventing sliding or twisting of the solid state imager, the optical assembly further having a flex strap biasing the solid state imager against the insulating back plate.

* * * * *